UNITED STATES PATENT OFFICE.

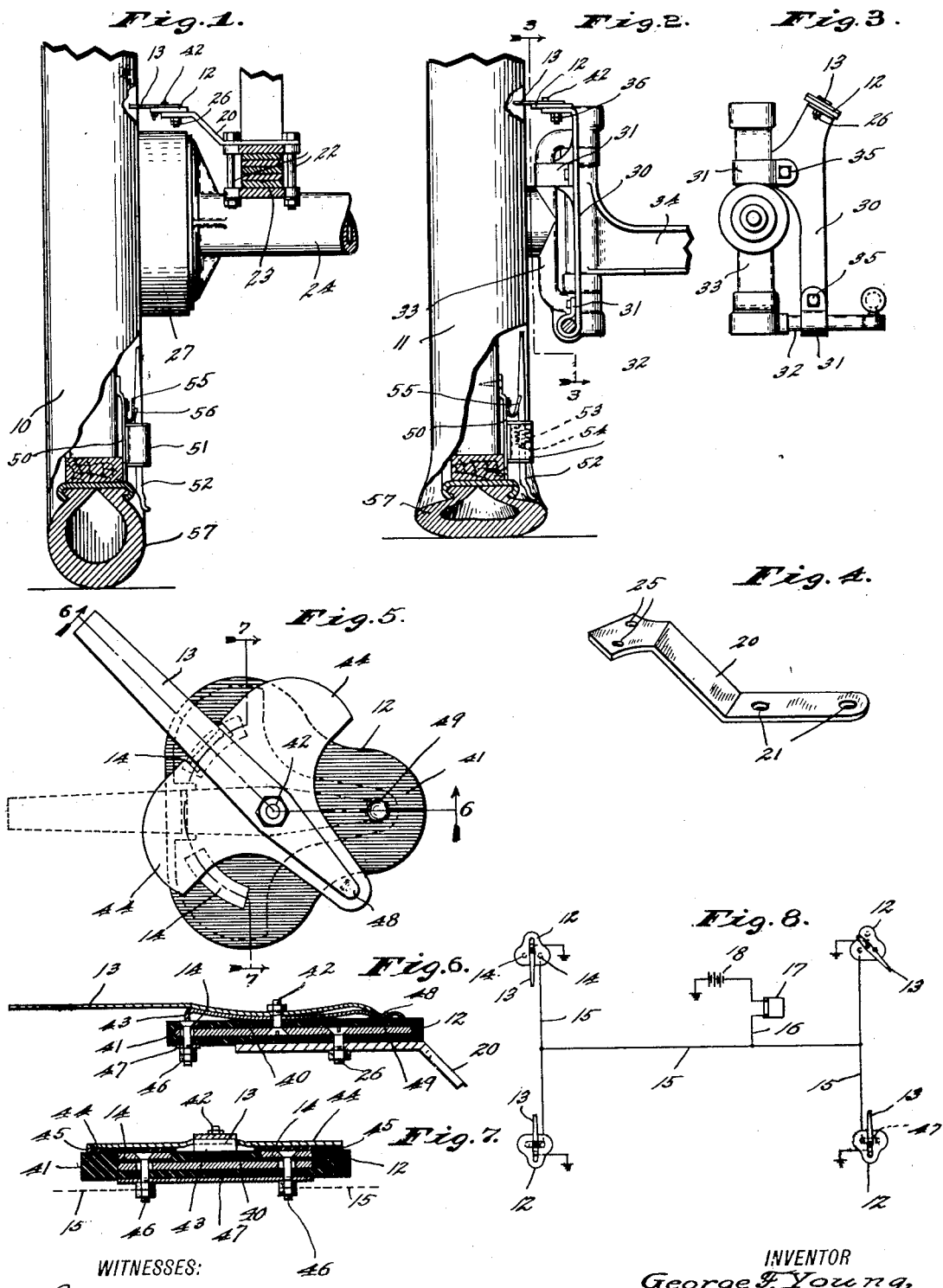

GEORGE F. YOUNG, OF INDIANAPOLIS, INDIANA.

COLLAPSED-TIRE ALARM.

1,198,688.

Specification of Letters Patent.

Patented Sept. 19, 1916.

Application filed November 25, 1914. Serial No. 873,965.

*To all whom it may concern:*

Be it known that I, GEORGE F. YOUNG, a citizen of the United States, residing at Indianapolis, in the county of Marion and State of Indiana, have invented a new and useful Collapsed-Tire Alarm, of which the following is a specification.

It frequently happens that automobile tires become flat as by puncture or leakage, without the knowledge of the driver, and that the driver in consequence continues to drive his machine on the flat tires, resulting in the destruction of or very great injury to such tires.

It is the object of my present invention to provide simple and effective means for giving a warning signal to the driver in case of the flattening of a tire, and to prevent such means from becoming deranged, as by the accumulation of dirt or grease.

In carrying out my invention, I associate with each wheel a movable member which is operated upon the flattening of the tire, and provide an alarm which is controlled by the operation of such member. Conveniently the alarm is an electric signal, such as a buzzer, and in the preferred form of my invention a controlling switch for this buzzer is mounted on a nonrotatable part of the machine near each wheel and is arranged to be operated in a suitable manner upon the collapsing of the associated tire.

The accompanying drawing illustrates my invention.

Figure 1 is a fragmentary view of a rear wheel and part of the rear axle, and Fig. 2 is a similar view of the front wheel and part of the front axle, of an automobile equipped with my invention, some of the parts being broken away and in section in order better to show the operation of the parts; Fig. 3 is a section on the line 3—3 of Fig. 2; Fig. 4 is a perspective view of the switch-supporting member shown in Fig. 1; Fig. 5 is a plan view of the form of switch which I now prefer to use; Fig. 6 is a section on the line 6—6 of Fig. 5; Fig. 7 is a section on the line 7—7 of Fig. 5; and Fig. 8 is a diagram of the electric circuits.

Mounted in proximity to each rear wheel 10 and to each front wheel 11 of the automobile is a double throw electric switch 12 having an operating arm 13. The two contact points 14 of the switch 12 are on opposite sides of the normal position of the arm 13 and are connected together, and the contact points 14 of all the switches are connected by wires 15 to one side of an electric circuit 16 containing an electric signaling device 17, such as a buzzer or a bell, and a battery 18, the other side of such circuit being grounded on the vehicle frame, and the various operating arms 13 likewise being grounded, so that the signal circuit is completed upon the engagement of any arm 13 with either of its contact points 14. The various switches 12 are mounted so that they do not rotate with the wheels with which they are associated, but in position so that by means hereinafter described they will be thrown to one or the other of their closed positions upon the collapsing of the tires on such wheels. This form of mounting may take different forms, as circumstances or convenience requires. However, I have found that a convenient mounting for the switch 12 on each rear wheel is furnished by the bracket 20 shown in Figs. 1 and 4, this bracket 20 being provided at one end with holes 21 for receiving bolts 22 which clamp together the parts of the spring 23 supported on the rear axle 24 and at its other end the holes 25 for receiving the bolts 26 which clamp the switch 12 to it, the bracket being bent so as to extend over the brake drum 27 without touching it. I have also found that a convenient mounting for such switch on each front wheel is furnished by the bracket 30 shown in Figs. 2 and 3, this bracket 30 being provided at one end and at an intermediate point with strap extensions 31 which extend around the operating arm 32 and the vertical post 33 of the steering knuckle mounted on the front axle 34 and carrying the front wheel 11, these strap extensions being fastened to the body of the bracket by bolts 35, and the upper end of the bracket 30 being bent as shown and provided with holes for the reception of bolts 26 for clamping the switch 12 to it. The switch 12 itself may also take various forms. However, I now prefer the form shown in Figs. 5, 6, and 7 as I have found that such form is not deranged by the dirt and grease to which the position of the switch necessarily exposes it. In this form of switch, there is a metal base 40 which is substantially embedded in an insulating covering 41, of some suitable molded insulation, the base 40 serving both as a mechanical support and an electrical conductor. The bolts 26 mechanically and electrically connect this base 40 to the bracket 20 or 30, thus grounding it on the frame of the machine, and the operating arm 13 is likewise mechanically and electrically connected to this base 40 by a pivot bolt 42, the bolts 26 and 42 projecting from the upper and lower sides of the insulating covering 41 respectively.

The operating arm 13 for convenience in manufacture is made of an upper and a lower part, which move together, the upper part projecting from the body of the switch as shown, and the lower part having a central downturned connecting finger 43 for engaging the two contacts 14 when the arm is turned from its normal position (or dotted line position in Fig. 5) in either direction and with two wings 44 which normally overlie such two contacts 14 and protect them from dirt and dust, these wings 44 having an underlining 45 of soft rubber for preventing them from touching the contacts 14 and at the same time effectually keeping such contacts clean. However, in case any dirt or grease does get on such contacts, the downturned finger 43 will cut through it upon the operation of the switch. The contacts 14 are carried by the base 40, but insulated therefrom, and are mounted so that their upper surfaces are substantially flush with the insulating covering 41, these contacts 14 being fastened in position by bolts 46 which extend through them and the base 40 and project below the insulating covering 41, where their coöperating ends are clamped to a cross connector 47 which interconnects the two contacts 14, one of these bolts 46 serving as a convenient point of attachment for the wire 15. The rear end of the operating arm 13 projects beyond the bolt 42 and is provided with a button 48 on its under side for taking into a depression 49 in the upper surface of the insulating covering 41, for preventing the operating arm from being moved accidentally from its normal position, and for projecting beyond the edge of the insulation when the arm 13 is moved to working position to stop such arm in such working position.

While various forms of operating devices may be provided for the switch 12, I prefer the form shown in Figs. 1 and 2. A strip 50 is fastened radially on each wheel 10 or 11 and carries a cylinder 51, in which is mounted a plunger 52 which extends entirely through the cylinder 51 and is pressed radially outward by a spring 53 acting between one end of the cylinder 51 and a pin 54 carried by the plunger 52. The outer end of the plunger 52 is normally located in proximity to the tire 57 when such tire is inflated, as shown in Fig. 1, so that upon the collapsing of the tire, as shown in Fig. 2, the plunger 52 will be pushed radially inward against the action of the spring 53. A spring catch 55 is suitably mounted on the strip 50 and a notch 56 is provided in the plunger 52, so that when such plunger is pushed inward the catch 55 engages the notch 56 to hold the plunger in its innermost position. Normally the inner end of the plunger 52 just clears the operating arm 13 as the wheel 10 or 11 rotates, such arm 13 projecting past the plane of movement of such inner end, but upon the collapsing of the tire and the radially inward movement of the plunger, the inner end of the latter strikes the arm 13 as the wheel rotates and moves such arm so that its finger 43 engages one or the other of the contacts 14, thus closing the circuit of the buzzer 17 and giving a warning of the collapsing of the tire. The signal circuit remains closed until the switch 12 is reset by hand to inoperative position.

I claim as my invention:

1. In combination, an electric switch which is mounted in proximity to the wheel of a vehicle but so that it does not partake of the rotary movement of such wheel, and which will remain in closed position when once moved there though the moving force is released, and means arranged to be fixed upon the wheel to rotate therewith and to coöperate with the outside of the tire beside the wheel rim so that it is positively operated by the tire upon the collapsing of the tire of such wheel to a position to operate said switch as the wheel rotates.

2. In combination, an electric switch which is mounted in proximity to the wheel of a vehicle but so that it does not partake of the rotary movement of such wheel, and which will remain in closed position when once moved there though the moving force is released, and means coöperating with the outside of the tire beside the wheel rim so that it is positively operated by the tire upon the collapsing of the tire of such wheel to a position to operate said switch as the wheel rotates.

3. In combination, an electric switch which is mounted in proximity to the wheel of a vehicle but so that it does not partake of the rotary movement of such wheel, and which will remain in closed position when once moved there though the moving force is released, a member carried by said wheel and coöperating with the tire of such wheel at a point on the outer surface of the tire beside the wheel rim so as to be positively moved by the tire upon the collapsing of the tire, said member when in normal position clearing such switch as the wheel is rotated but when moved by the collapsing of the tire engaging such switch to throw it, said member being spring-pressed to the position in which it clears said switch.

4. In combination, an electric switch which is mounted in proximity to the wheel of a vehicle but so that it does not partake of the rotary movement of such wheel, and which will remain in closed position when once moved there though the moving force is released, a member carried by said wheel and coöperating with the tire of such wheel at a point on the outer surface of the tire beside the wheel rim so as to be positively moved by the tire upon the collapsing of the tire, said member when in normal position clearing such switch as the wheel is rotated but when moved by the collapsing of the tire engaging such switch to throw it.

5. In combination, an electric switch which is mounted in proximity to the wheel of a vehicle but so that it does not partake of the rotary movement of such wheel, and which will remain in closed position when once moved there though the moving force is released, a member carried by said wheel and coöperating with the tire of such wheel at a point on the outer surface of the tire beside the wheel rim so as to be positively moved by the tire upon the collapsing of the tire, said member when in normal position clearing such switch as the wheel is rotated but when moved by the collapsing of the tire engaging such switch to throw it, said member being spring-pressed to the position in which it clears said switch, and means for holding said member in position so that it engages said switch after it has once been moved to such position by the collapsing of the tire.

In witness whereof I have hereunto set my hand at Indianapolis, Indiana, this twenty-third day of November, A. D. one thousand nine hundred and fourteen.

GEORGE F. YOUNG.

Witnesses:
FRANK A. FAHLE,
LOUISE BENNETT.